United States Patent [19]
Stein

[11] 3,760,474
[45] Sept. 25, 1973

[54] REVERSIBLE BLADE-LIKE CUTOFF TOOL
[75] Inventor: William B. Stein, Barberton, Ohio
[73] Assignee: The Warner & Swasey Company, Cleveland, Ohio
[22] Filed: Nov. 4, 1971
[21] Appl. No.: 195,560

[52] U.S. Cl. .............................................. 29/95 R
[51] Int. Cl. .............................................. B26d 1/00
[58] Field of Search ................................. 29/95, 96

[56] References Cited
UNITED STATES PATENTS
3,296,683   1/1967   Kaiser ................................. 29/96
3,436,799   4/1969   Kopy .................................. 29/96
R25,955     2/1966   Emmons .............................. 29/95
FOREIGN PATENTS OR APPLICATIONS
552,382     4/1943   Great Britain ...................... 29/95

14,012   6/1913   Great Britain ........................ 29/95

Primary Examiner—Harrison L. Hinson
Attorney—J. William Freeman et al.

[57] ABSTRACT

A blade-like cutoff insert blank that consists of a thin, flat unitary body portion that is of rhomboidal configuration in side elevation in the preferred form. The opposed sides of the blade are provided with diagonally extending undercut areas that define triangular cutting edges, with the undercut areas permitting grinding of the requisite side clearance on the cutting edges. The use of the rhomboidal configuration automatically builds in the requisite front clearance angles and eliminates the need for individually grinding the same.

6 Claims, 8 Drawing Figures

PATENTED SEP 25 1973

3,760,474

INVENTOR.
WILLIAM B. STEIN
BY Freeman Taylor
ATTORNEYS 3,760,474

REVERSIBLE BLADE-LIKE CUTOFF TOOL

BACKGROUND OF THE INVENTION AND DESCRIPTION OF THE PRIOR ART

In the art of metal cutoff, pressures are absorbed in a direction that is downward with respect to the cutting component per se, and as a result of this the prior art has long used a knife-like or blade-like configuration when attempting cutoff operations.

Initially, the machinist grinding his own cutoff tool would grind the bar-like tool bit so that a blade-like configuration projected from the frontal portion of the tool.

The next improvement along those lines included the use of a consumable blade-like portion that could be repetitively sharpened if wear occurred.

Luers U.S. Pat. No. 2,223,831 is representative of this initial blade type construction with it being noted in Luers, as well as in all of the prior art, that the requisite front, side and back clearance angles are provided in known fashion so that the maximum width of the cutoff tool exists at the cutting edge where contact is made with the rotating work piece.

The next major variation in the field of cutoff occurred in the 1950's as disclosed best in Novkov U.S. Pat. No. 2,964,833. In essence, the Novkov concept set forth in the above mentioned patent disclosed a new geometry for the consumable component by making the same more or less pencil-like in its configuration and providing means for interlocking the same with a blade-like support blade.

In making such insert with an approximately square cross section, strength characteristics not heretofore known were achieved because of the fact that the overall combination of blade and insert closely approached the blade per se construction of Luers, for example, with respect to overall strength under deflection conditions.

Tooling of this type has enjoyed wide-spread commercial success and is in current use world wide.

In U.S. Pat. No. 3,551,977, the Novkov geometry was, to some extent, reversed to produce a blade-like geometry having some characteristics of the prior art but differing materially therefrom in the details shown in said patent in that reversibility in a properly supported mode was achieved.

SUMMARY OF THE INVENTION

In the present invention a blade-like geometry is again employed, but in the present invention the blades are undercut at certain regions and formed to a special contour in other regions so as to eliminate some of the grinding problems that normally occur with respect to cutoff blades of this type.

Additionally, this unique arrangement and configuration is such that the tool is reversible so as to, in effect, double the life of the cutoff tool.

Production of an improved cutoff tool having the above characteristics accordingly becomes the principal object of this invention, with this and other objects of the invention becoming more apparent upon a reading of the following brief specification, considered and interpreted in view of the accompanying drawings.

OF THE DRAWINGS

Figure 3:
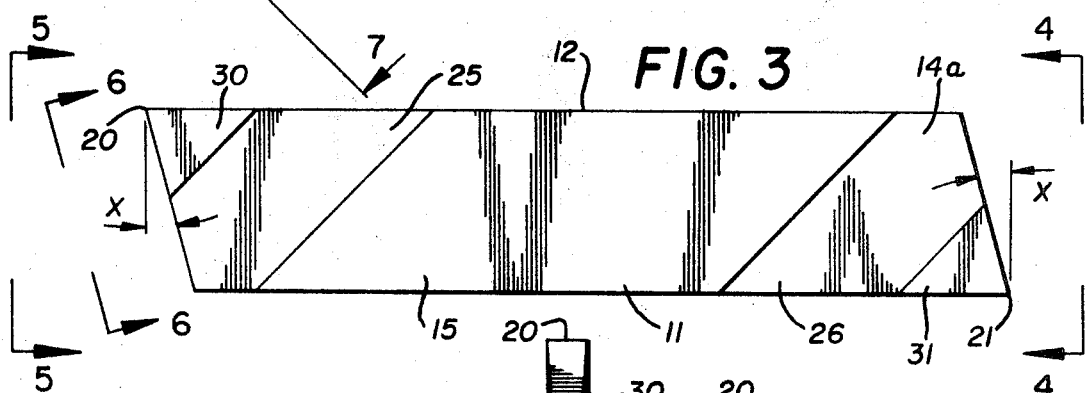
FIG. 3 is a side elevational view of the improved insert.
Figure 7:
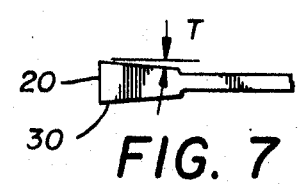
Figure 8:
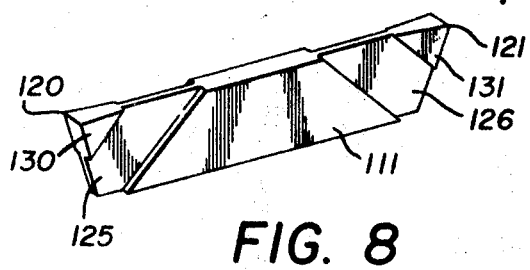

FIGS. 4, 5, 6, and 7 are views taken on the lines 4—4, 5—5, 6—6, and 7—7 respectively of FIG. 3. FIG. 8 is a perspective view of a modified form of the invention.

DESCRIPTION OF THE PREFERRED EMBODIMENTS

Figure 1:
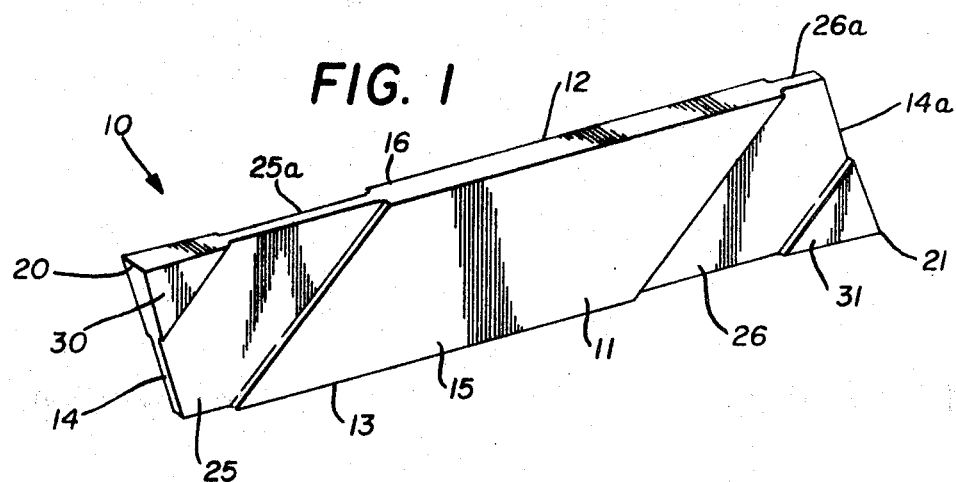
FIG. 1 is a perspective view of the improved insert blank.

Referring now to the drawings and in particular to FIG. 1, the improved cutoff insert blade, generally referred to by the numeral 10, is shown consisting of a unitary, blade-like body portion 11 that includes opposed longitudinal edges 12, 13, transversely extending opposed end surfaces 14 and 14a, and side surfaces 15 and 16, with the body member 11 being rhomboidal in side elevational view as best shown in FIG. 3.

Cutting edges 20 and 21 are provided in diagonally opposed relationship to each other as shown in FIGS. 1 and 3 of the drawings, with the edge 20 being defined by the line of juncture between the surfaces 14 and 16, while the cutting edge 21 is defined by the line of juncture between the surfaces 14a and 13.

By use of the rhomboidal configuration just described, it is possible to provide a front clearance angle on the surfaces 14 and 14a, with this angle being indicated by the letter X in FIG. 3 of the drawings.

For the purpose of maintaining a minimum thickness, while yet permitting grinding of side clearance angles, the side 15 is undercut diagonally to provide opposed undercut surfaces 25 and 26, while opposed undercuts 25a and 26a are provided on the surface 16 in opposed relationship to the undercuts 25 and 26.

By this arrangement, pairs of diagonally opposed undercut surfaces are provided so as to, in effect, define triangular cutting tips 30 and 31 that are disposed in diagonally opposed relationship to each other, with the cutting edge 20 being provided on the cutting tip 30 while the cutting edge 21 is provided on the cutting tip 31, as clearly shown in the drawings.

It should be noted herein that the surfaces 30 and 31, in FIG. 1 for example, are shown as being triangular in planar configuration. This is not absolutely essential, and the line from the top surface 16 to the front surface 14, for example, could be arcuate instead of straight.

Figure 2:
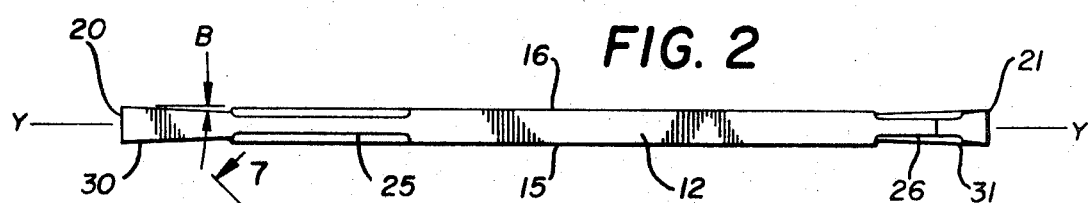
FIG. 2 is a top plan view thereof.

In cutoff tooling it is important that the tool be dynamically balanced about its longitudinal center line which is indicated by the line Y,Y in FIG. 2 of the drawings. Thus, the side surfaces 15 and 16 and the undercut surfaces thereon are equal distance from the longitudinal center line as shown in FIG. 2 of the drawings.

It is further necessary in cutoff operations to have provided side clearance angles that are dynamically balanced with respect to the longitudinal center line and is also desirable and necessary to have back clearance provided in cutoff inserts.

Figures 5, 6:
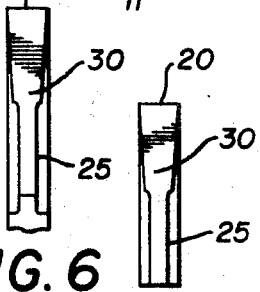
Figure 4:
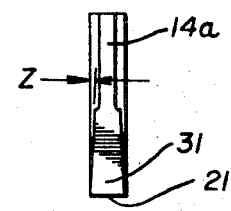

Referring to FIGS. 4, 5, and 6, it will be noted that a side clearance angle, indicated by the letter Z, is provided along the opposed faces of the cutting tips 30 and 31, with FIG. 2 indicating the provision of a back clearance angle B that is provided on the opposed surfaces of the cutting tips 30 and 31. The angle T in FIG. 7 shows how angles B and Z are generated by grinding. It is possible to provide the side and back clearance angles on the opposed faces of the insert cutting tips 30 and 31 because of the fact that the undercut surfaces 25, 26, 25a, and 26a provide room for clearance during grinding of these angles. No rake angle has been shown in the preferred embodiment although it is believed apparent that either negative or positive rake angles could be ground into the edges 12 or 13 as required.

In use or operation of the improved insert, the same is normally molded or otherwise machined to shape from a carbide or other cutting tool material type of blank, and the rhomboidal stock piece is merely machined or molded so that the undercut surfaces 25, 26, 25a and 26a are provided therein.

At the time of shipment, it is merely necessary to grind the opposed sides of the cutting tips 30 and 31 in the manner described so as to provide the side clearance angle Z and the back clearance angle B thereon.

At this time the tool is ready for use and may be inserted into a tool holder having an appropriate configuration to receive the blade. In the form shown in FIGS. 1 and 8, of course, one end of the blade would be set for operation or use while the other would be recessed within the blade-supporting mechanism for later use.

It should also be pointed out that, as illustrated in the drawings, the cutting edges 20 and 21 are shown as the same width as the top surface 12 of the body 11. This is not absolutely necessary, and the respective width of the cutting edges 20 and 21 could be equal to, less than, or greater than the width of the body 12.

FIG. 8 shows a modified form of the invention which is substantially identical in principle, but which utilizes a trapazoidal configuration as contrasted to the rhomboidal configuration shown in FIGS. 1 through 7. The principles and components of the insert, however, are identical except for the overall side elevation configuration of the insert.

Accordingly then, opposed cutting areas 130 and 131 are provided with cutting edges 120 and 121. The recessed areas 125 and 126 are in opposed relationship to each other and bound the central portion 111.

While carbide has been indicated as the preferred material becuase of its inherent hardness and cutting characteristics and adaptability to molding, it is to be understood that the invention is not intended to be limited to any particular material.

Accordingly, other known cutting materials may be employed where less severe cutting requirements are involved.

Also, while a rhomboidal configuration has been described, it is believed apparent that some modifications could be resorted to which would not result in a true rhomboid.

It should be pointed out at this point also that while blades of either a rhomboidal or trapazoidal configuration have been illustrated, the principles of the invention could also be utilized with other planar configurations, such as triangular for example.

Furthermore, both the form of the invention shown in FIG. 1 and the form shown in FIG. 8 discloses double ended blades which have cutting edges at opposed ends. The basic concept disclosed in this application could also be applied to a version of the tool in which only one end carries a cutting edge.

Additionally, while the tool has been illustrated as being all of one piece and presumably all of the same material, it would be possible to provide, for example, for the areas 30 and 31 of FIG. 1 to be of one material and be welded onto the body. Similarly, the body 11 could be of one material, and the portions indicated by the numerals 25,26 and 30,31 could be welded to the body 11 thereby permitting the use of different materials if desired.

Modifications of the invention may be resorted to without departing from the spirit hereof or the scope of the appended claims.

What is claimed is:

1. A blade-like cutoff insert blank of the character described, comprising;
   A. a thin, flat body portion of guadrilateral configuration in side elevation and having
      1. a top edge and a front edge that intersect at an acute angle to form a cutting edge;
      2. opposed side surfaces; and
      3. identical undercut areas provided on each said side surface in opposed relationship to each other and extending diagonally from said top edge to said front edge whereby a generally triangular cutting tip portion of increased thickness is provided.

2. A blade-like cutoff insert, comprising;
   A. a thin, flat elongate body portion having a pair of opposed cutting edges at the longitudinal extremities thereof, with each said cutting edge having
      1. a top edge and a front edge that intersect at an acute angle to form a cutting edge,
      2. opposed side surfaces, and
      3. identical undercut areas provided on each said side surface in opposed relationship to each other and extending diagonally from said top edge to said front edge whereby a generally triangular cutting tip portion of increased thickness is provided.

3. The insert of claim 2 wherein said pair of cutting edges are diagonally opposed to each other.

4. The insert blank of claim 2 further characterized by the fact that said cutting edges are both located in said top edge.

5. The insert blank of claim 2 further characterized by the fact that said insert is of rhomboidal configuration in side elevation.

6. The insert blank of claim 1 further characterized by the fact that said cutting edge is provided with side and back clearance angles.

* * * * *